UNITED STATES PATENT OFFICE.

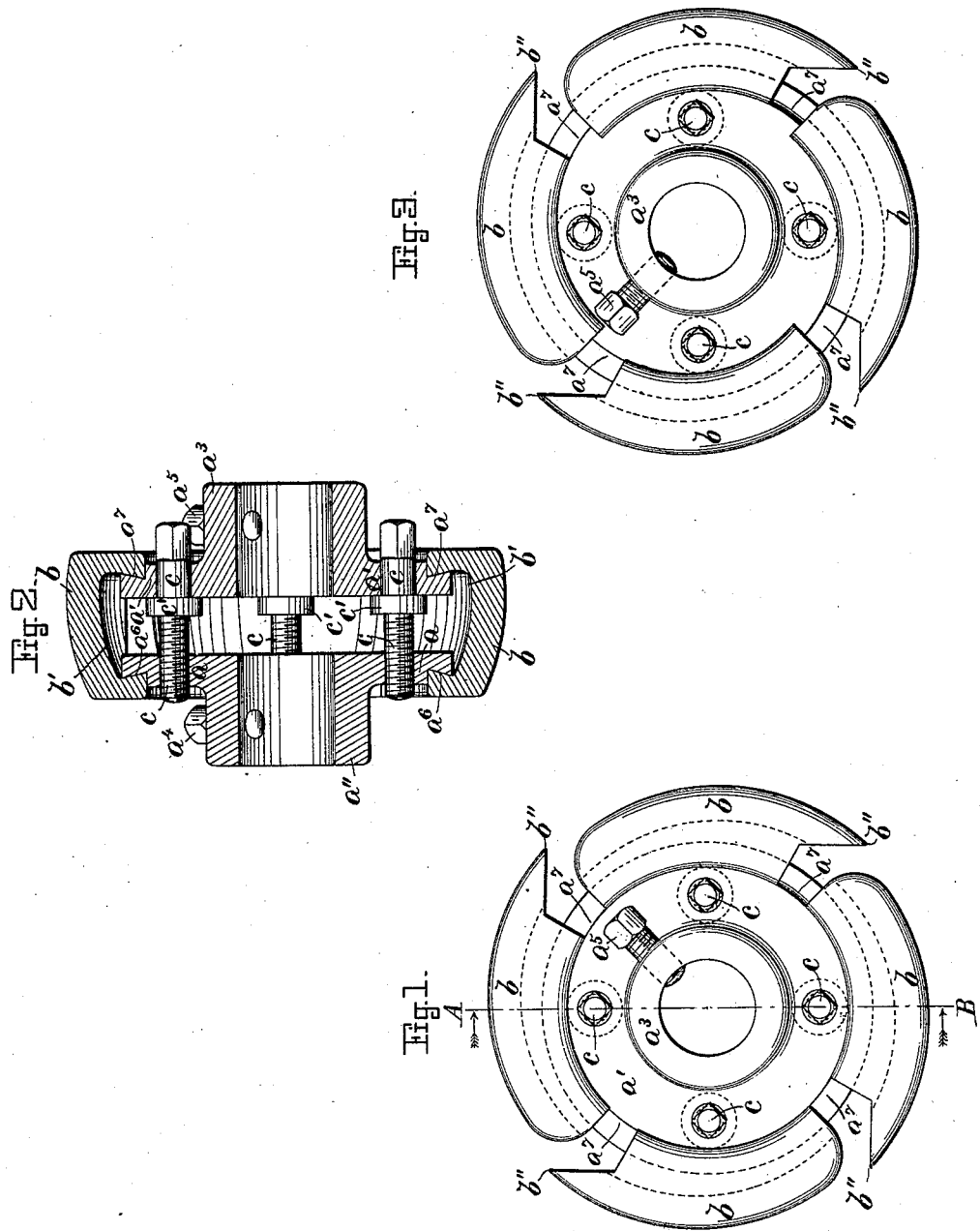

ALFRED B. FOWLER, OF EXETER, NEW HAMPSHIRE.

ROTARY CUTTER AND TRIMMER.

SPECIFICATION forming part of Letters Patent No. 425,214, dated April 8, 1890.

Application filed March 5, 1889. Serial No. 301,833. (No model.)

*To all whom it may concern:*

Be it known that I, ALFRED B. FOWLER, a citizen of the United States, and a resident of Exeter, in the county of Rockingham and State of New Hampshire, have invented certain new and useful Improvements in Rotary Cutters and Trimmers, of which the following, taken in connection with the accompanying drawings, is a specification.

This invention relates to improvements in rotary cutters or trimmers more especially adapted to trimming the heels of boots and shoes; but it may be used for other purposes by simply changing the shape of the knives of the cutter without departing from my invention, which has for its object to produce a simple, cheap, and durable cutter, one in which the knives may easily be changed from one style of cutter to another, or from one width to another width, and also one in which any one or more of the knives may be replaced if they should become broken in use.

The invention is carried out as follows, reference being had to the accompanying drawings, wherein—

Figure 1 represents a front elevation of my improved cutter or trimmer of suitable form for trimming heels of boots or shoes. Fig. 2 represents a cross-section of the same on the line A B shown in Fig. 1, and Fig. 3 represents a modification of the cutter.

Similar letters refer to similar parts wherever they occur on the different parts of the drawings.

$a$ and $a'$ represent a pair of disks, shown in the drawings as provided with the respective perforated hubs $a''$ and $a^3$ and the respective set-screws $a^4$ and $a^5$ for securing said disks firmly on a suitable shaft; but this is not necessary, as the disks may be provided with any other and well-known means for securing them to a revolving part of the machine on which the cutter is to be used without departing from the spirit of my invention.

The disks $a$ and $a'$ are each provided with the respective V-shaped rabbets $a^6$ and $a^7$ on their outer faces, so as to form an annular dovetailed projecting rim to the disks when they are placed on a shaft with their inner faces together.

In Figs. 1 and 2 I have shown the disks as being of a circular form; but this is not essential, as they may to equal advantage be made cam-shaped, as shown in Fig. 3, or polygonal, having as many sides as I desire to use knives, without departing from my invention.

$b\ b\ b$ represent the knives or teeth of the cutter, any desired number of which may be used. These knives are each provided with a dovetailed groove $b'$, as shown in Fig. 2, which is adapted to fit over and receive the dovetailed rim of the disks $a$ and $a'$. The knives are to be made of such a shape as to give the cutter the desired clearance between the cutting-edges $b''\ b''$ of each succeeding knife.

$c\ c\ c$ represent screw-threaded studs or bolts, which are screwed into screw-threaded perforations in the disk $a$, the heads of such bolts projecting through corresponding perforations in the disk $a'$, as shown in Fig. 2. An annular collar $c'$ is made on each of the bolts $c$, which is adapted to rest against the inner face of the disk $a'$. The heads of the bolts $c$ project beyond the outer face of the disk $a'$, and are preferably squared to receive a suitable wrench for turning said bolts. Any number of bolts $c$ may be used; but I prefer to use one for each knife or tooth used in forming the cutter.

It will be seen that when the knives $b\ b$ are placed upon the disks $a\ a'$, with the dovetailed rim of said disks within the dovetailed grooves $b'\ b'$ of such knives, if a wrench should be applied to the heads of the bolts $c\ c$ and said bolts unscrewed from the disk $a$, the collars $c'\ c'$ would come in contact with the inner face of the disk $a'$ and tend to force the disks away from each other, causing the knives $b\ b$ to be clamped firmly on the dovetailed rim of the disks, holding the knives in their proper places while the cutter is being used. The outer edge of the knives may be made of any desired shape, according to the work that is required to be performed by the cutter.

By constructing the cutter as described the width of the working-face of the cutter may be changed by simply screwing the bolts $c\ c$ into the disk $a$ and removing the knives $b\ b$ and supplying their places with knives of the desired width, and it will be seen that the same can be done should one of the knives be accidentally broken.

By forming the cutter of two or more independent knives it will be seen that knives of uniform temper and hardness may be selected to form the cutter.

I disclaim, in a heel-trimming machine, the combination, with the cutters having grooves on their inner surfaces arranged substantially at right angles with the axis of rotation of the cutter-head, of an expansible two-part holder formed to enter said grooves and composed of a section secured to a shaft and a movable section adapted to be moved or adjusted outward crosswise of said grooves, whereby the holder is enabled to engage the sides of said grooves, substantially as set forth, the minimum conjoint width of said section being less than that of the said grooves of the cutters, as stated, as I am not the first inventor thereof.

Having thus fully described the construction, use, and operation of my invention, I wish to secure by Letters Patent and claim—

The grooved disks $a\,a'$, two or more grooved knives or teeth $b\,b$, and two or more studs or bolts $c\,c$, screwed into screw-threaded perforations in the disk $a$ and having annular collars $c'\,c'$ to bear against the inner face of the disk $a'$, the heads of said bolts passing through perforations in the disk $a'$, all combined to form a rotary cutter or trimmer, as and for the purpose set forth.

In testimony whereof I have signed my name to this specification, in the presence of two subscribing witnesses, on this 27th day of February, A. D. 1889.

ALFRED B. FOWLER.

Witnesses:
 HENRY CHADBOURN,
 D. E. KEMPSTER.